(12) United States Patent
Chamberlayne

(10) Patent No.: US 8,075,202 B1
(45) Date of Patent: Dec. 13, 2011

(54) MALE CONNECTOR FOR A CAMERA CARRYING DEVICE

(76) Inventor: Andrew Chamberlayne, North Vancouver (CA)

( * ) Notice: Subject to any disclaimer, the term of this patent is extended or adjusted under 35 U.S.C. 154(b) by 0 days.

(21) Appl. No.: 12/795,588

(22) Filed: Jun. 7, 2010

(51) Int. Cl.
*G03B 17/00* (2006.01)
*B65D 25/52* (2006.01)

(52) U.S. Cl. ........................ 396/423; 224/197
(58) Field of Classification Search .......... 396/420, 396/423; 224/197–200, 271
See application file for complete search history.

(56) References Cited

U.S. PATENT DOCUMENTS

| | | | |
|---|---|---|---|
| 2,130,262 A | 9/1938 | Burlin | |
| 2,723,430 A | 11/1955 | Paillard | |
| 2,990,089 A | 6/1961 | Nystrom | |
| 3,884,403 A | 5/1975 | Brewer | |
| 3,938,166 A | 2/1976 | Sloop | |
| 4,058,242 A | 11/1977 | Brewer | |
| 4,328,917 A | 5/1982 | Reeberg | |
| 4,416,405 A | 11/1983 | Caillouet | |
| 4,419,794 A | 12/1983 | Horton et al. | |
| 4,461,411 A | 7/1984 | Harrow | |
| 4,473,177 A | 9/1984 | Parandes | |
| 4,714,184 A | 12/1987 | Young et al. | |
| 5,014,892 A | 5/1991 | Copeland | |
| 5,172,838 A | 12/1992 | Rowell et al. | |
| 5,251,800 A | 10/1993 | Leenders | |
| 5,375,749 A | 12/1994 | Oliva | |
| 5,850,954 A | 12/1998 | Kim | |
| 5,850,996 A * | 12/1998 | Liang | 248/221.11 |
| 7,162,281 B2 | 1/2007 | Kim | |
| 7,624,901 B1 | 12/2009 | Mozes | |
| 2003/0098323 A1 | 5/2003 | Taylor et al. | |
| 2004/0200867 A1 | 10/2004 | Chee | |
| 2009/0196596 A1 | 8/2009 | Chamberlayne | |
| 2010/0054724 A1 | 3/2010 | Chamberlayne | |

FOREIGN PATENT DOCUMENTS

GB 871489 6/1961
(Continued)

OTHER PUBLICATIONS

Abstract of Japanese Publication No. 2003116621 with data supplied by the espacenet database.

(Continued)

*Primary Examiner* — W. B. Perkey
(74) *Attorney, Agent, or Firm* — Cameron IP

(57) ABSTRACT

A device for rotatably mounting a camera on a person comprises a female connector and a male connector. The female connector has a U-shaped slot defined by a pocket and a pair of opposed channels which extend from the pocket. The male connector has a wedge shaped base, a plate spaced-apart form the base, and an opening extending through the wedge shaped base and the plate. The plate is slidably received by the U-shaped slot of the female connector and rotatable through 360 degrees within the pocket of the female connector. A threaded member extends through the opening in the male connector. The threaded member is for engaging a threaded tripod receiver of the camera. A strap assembly is connected to the female connector. The strap assembly is for mounting the device to the person. The plate of the male connector has a first rotatable position within the pocket of the female connector in which the male connector is secured to the female connector, and a second rotatable position within the pocket of the female connector in which the male connector is releasable from the female connector.

12 Claims, 14 Drawing Sheets

FOREIGN PATENT DOCUMENTS

| | | |
|---|---|---|
| JP | 2000321655 | 11/2000 |
| JP | 2003116621 | 4/2003 |
| WO | WO 83/01370 | 4/1983 |
| WO | WO 97/36516 | 10/1997 |
| WO | WO 2009/039292 A1 | 3/2009 |

OTHER PUBLICATIONS

Abstract of Japanese Publication No. 2000321655 with data supplied by the espacenet database.

* cited by examiner

MALE CONNECTOR FOR A CAMERA CARRYING DEVICE

BACKGROUND OF THE INVENTION

1. Field of the Invention

The present invention relates to a camera carrying device and, in particular, to a device for rotatably mounting a camera on a person.

2. Description of the Related Art

Camera carrying devices are well known, the simplest being a strap, secured to a camera, which allows a person to carry the camera around their neck or shoulder. However, the strap allows the camera to swing freely about the person. The camera may therefore become damaged upon impact with the person or another object. The strap may also become entangled with the camera, the person, or another object and consequently interfere with the person's ability to take a picture. To overcome the above-mentioned shortcomings numerous body-mounted camera cases have been developed. Carrying a camera disposed within a body-mounted camera case removes the need to have a strap secured to the camera. However, conventional body-mounted camera cases are also limiting. The time required to remove the camera from within the case may prevent a person from taking a desired photograph, particularly, in situations where the scene is fluid. There is accordingly a need for an improved camera carrying device.

United States Patent Application Publication Number 2009/0196596 to Chamberlayne which was published on Aug. 6, 2009 discloses a device for rotatably mounting a camera on a person. The device comprises a female connector having a U-shaped slot which is defined by a curved pocket and a pair of opposed channels that extend from the pocket. The U-shaped slot receives a male connector which includes a circular plate that is freely rotatable within the U-shaped slot and an elongate threaded member for engaging a female tripod receiver of the camera extends concentrically of the circular plate. A strap assembly secures the female connector to a person, thereby allowing the camera to be rotatably mounted on the person.

United States Patent Application Publication Number 2010/0054724 also to Chamberlayne which was published on Mar. 4, 2010 discloses a similar device for rotatably mounting a camera on a person and is further provided with a locking mechanism. The U-shaped slot of the female connector includes a bulb shaped opening disposed between the pair of opposed channels that extend from the curved pocket. The bulb shaped opening is defined by a circular portion and an elongate portion that extends from the circular portion. The male connector includes a truncated cylindrical body disposed between a pair of circular plates. The truncated cylindrical body includes a pair of opposite flat surfaces. A first one of the plates is freely rotatable within the U-shaped slot and an elongate threaded member for engaging a female tripod receiver of the camera extends concentrically of a second one of the plates. The male connector is only releasable from the female connector when the flat edges of the truncated cylindrical body of the male connector are aligned with the elongate portion of the bulb shaped opening in the U-shaped slot of the female connector. This prevents the male connector from being accidentally decoupled from the female connector.

Both of the above mentioned references are incorporated herein by reference.

SUMMARY OF THE INVENTION

It is an object of the present invention to provide an improved male connector for a camera carrying device used to rotatably mount a camera on a person.

There is accordingly provided a device for rotatably mounting a camera on a person. The device comprises a female connector and a male connector. The female connector has a U-shaped slot defined by a pocket and a pair of opposed channels which extend from the pocket. The male connector has a wedge shaped base, a plate spaced-apart form the base, and an opening extending through the wedge shaped base and the plate. The plate is slidably received by the U-shaped slot of the female connector and rotatable through 360 degrees within the pocket of the female connector. A threaded member extends through the opening in the male connector. The threaded member is for engaging a threaded tripod receiver of the camera. A strap assembly is connected to the female connector. The strap assembly is for mounting the device to the person. The plate of the male connector has a first rotatable position within the pocket of the female connector in which the male connector is secured to the female connector, and a second rotatable position within the pocket of the female connector in which the male connector is releasable from the female connector.

The female connector may be defined by a plate and a U-shaped protrusion with the U-shaped protrusion being integral with and protruding from the plate. The female connector may further include a bulb shaped opening in the U-shaped protrusion. The bulb shaped opening is disposed between the pair of opposed channels which extend from the pocket. The female connector may also be disposed with a vest or holster which form part of the strap assembly.

The male connector may further include a central body disposed between the wedge shaped based. Preferably the central body of the male connector being a truncated cylindrical body with a straight edge so that the plate of the male connector can only be received or released from the U-shaped slot of the female connector when the straight edge of the truncated cylindrical body of the male connector is aligned with one of the opposed channels of the female connector. The plate of the male connector may be circular and disposed concentrically adjacent a sloped surface of the wedge shaped base. The wedge shaped base has a slope of between 5° and 25° and preferably a slope of 15°. This slope of the wedge shaped based prevents free cantilevering of the camera. This also reduces stress on both the device and the camera.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
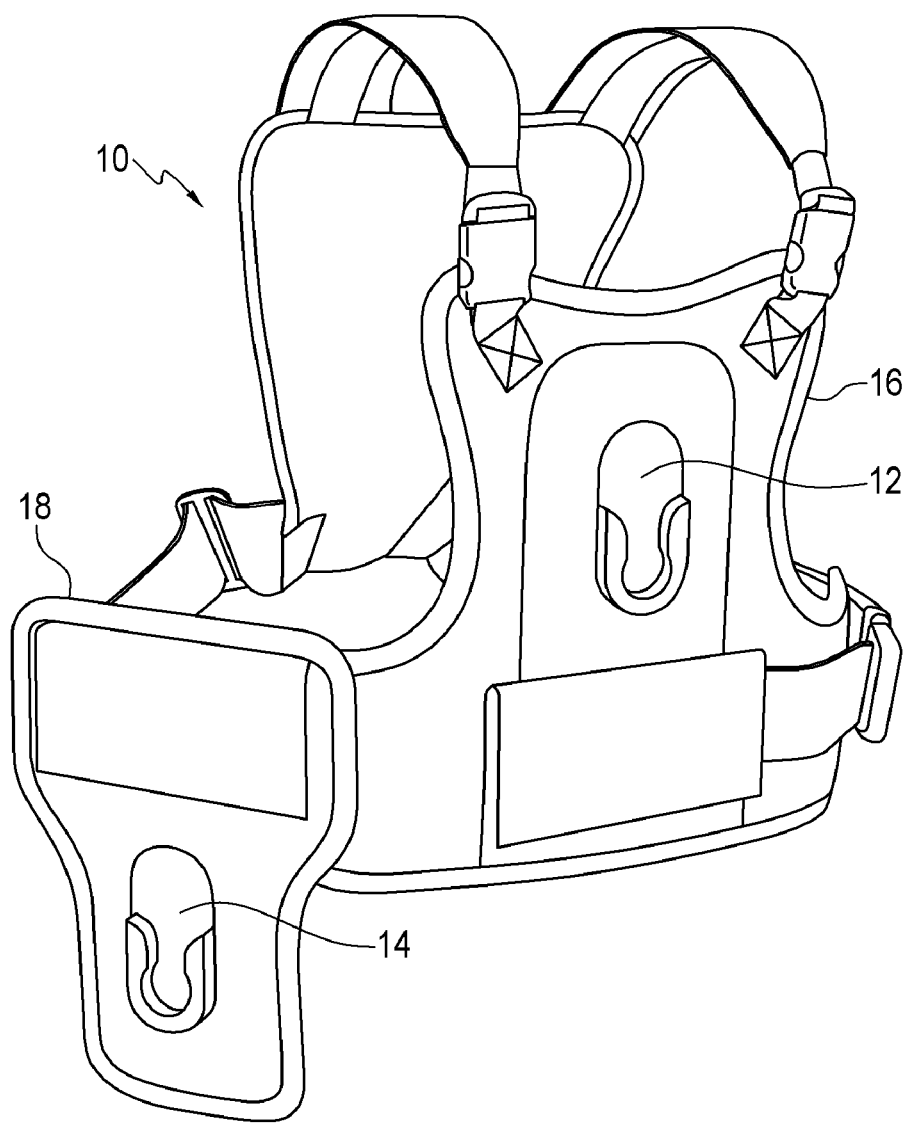
FIG. 1 is a front, side perspective view showing a device for rotatably mounting one or more cameras on a person.

Referring to the drawings and first to FIG. 1, this shows a device 10 for rotatably mounting one or more cameras on a person. The device 10 includes a pair of female connectors 12 and 14. The female connectors 12 and 14 are disposed on a strap assembly which includes a vest 16 and a holster 18. A first one of the connectors 12 is disposed on the vest 16. A second one of the connectors is disposed the holster 18. In this example, the holster 18 is coupled to the vest 16 and both the holster and the vest are formed from 1680 denier polypropylene material although other materials may be used. The female connectors 12 and 14 have a substantially similar structure with similar parts performing similar functions. Accordingly, only the first female connector 12 is described in detail herein.

Figure 2:
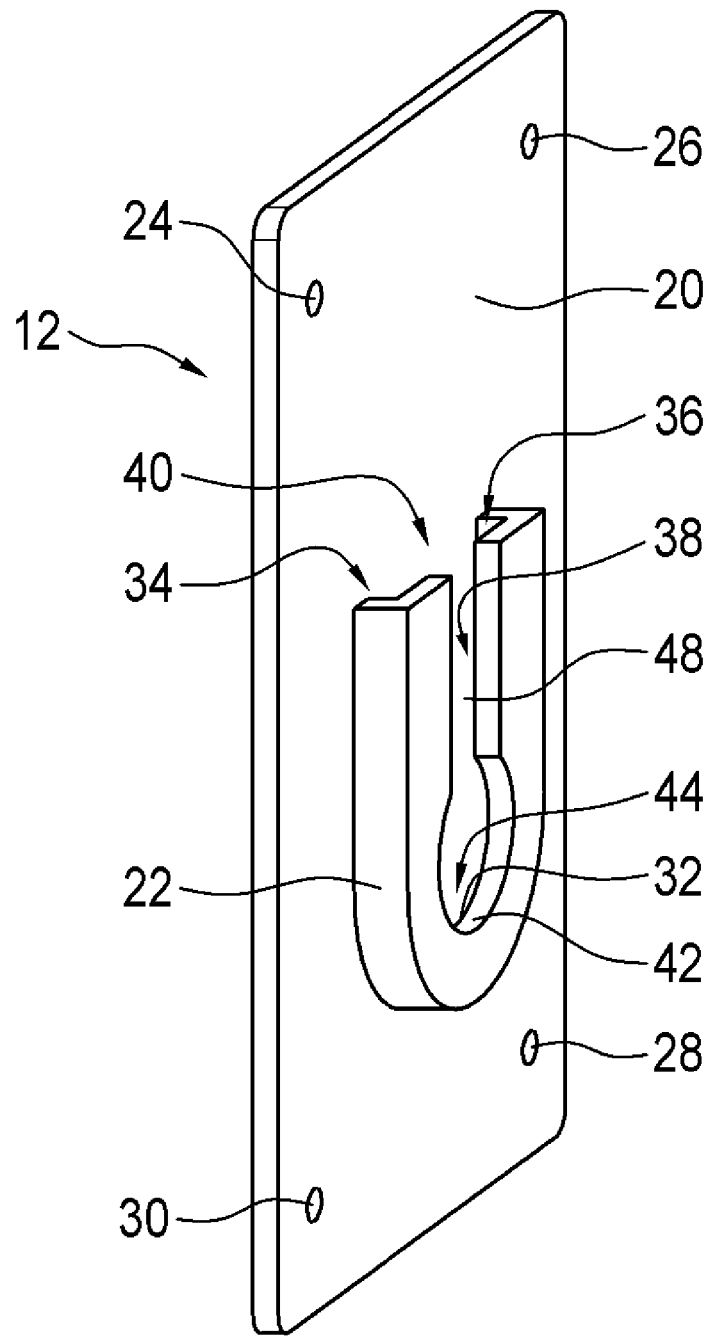
FIG. 2 is a front, side perspective view showing a female connector of the device of FIG. 1.
Figure 3:
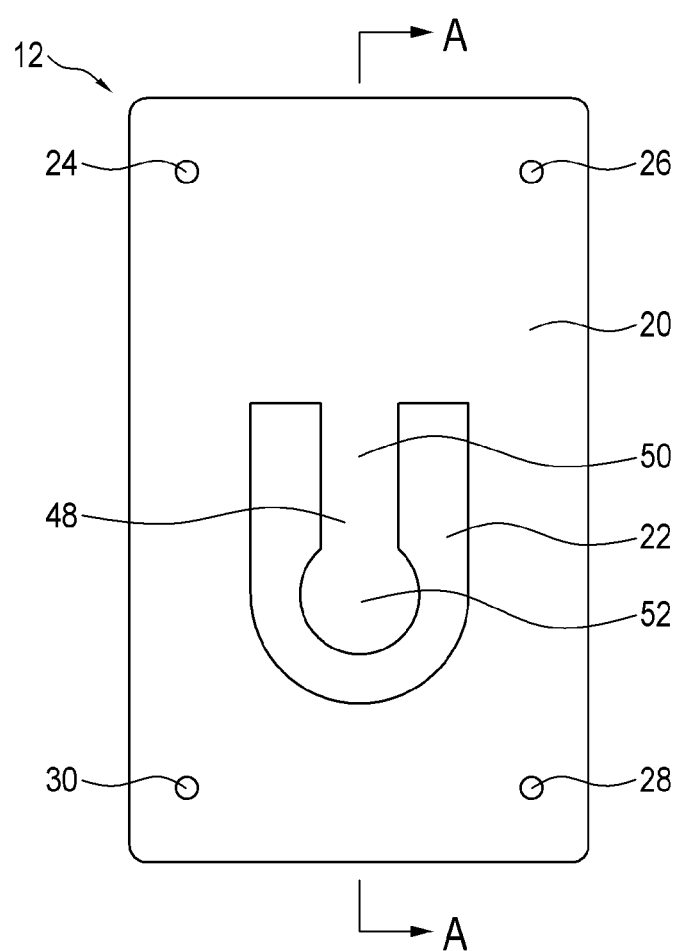
FIG. 3 is a front elevation view of the female connector of FIG. 2.
Figure 4:
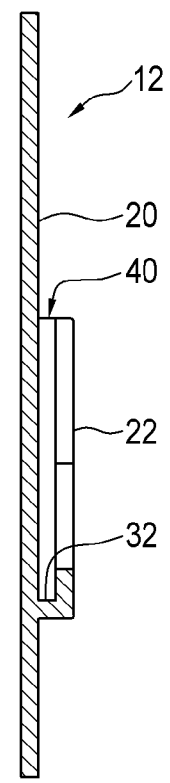
FIG. 4 is an elevation view taken down line A-A of FIG. 3.

The first female connector 12, which is shown in greater detail in FIGS. 2 to 4, includes a plate 20 and a hollow U-shaped protrusion 22. In this example, the female connector is formed from a polycarbonate resin thermoplastic, namely, Lexan® although other materials may be used. The U-shaped protrusion 22 is integrally formed with and protrudes from the plate 20. The plate 20 is generally rectangular and has apertures 24, 26, 28 and 30 near each corner thereof. The apertures 24, 26, 28 and 30 provide means to connect the female connector 12 to the vest 16 which is shown in FIG. 1. As best shown in FIG. 2, the plate 20 and the U-shaped protrusion 22 define a generally curved pocket 32 and a pair of opposed channels 34 and 36 which extend from the pocket 32. The pocket 32 and the channels 34 and 36 define a substantially U-shaped receptacle, or slot 38, which may slidably receive a plate through an opening 40 disposed between the channels 34 and 46. There is a lip 42 at a mouth 44 of the pocket 32. An opening 48 which separates the channels 34 and 36 extends from the lip 42. As best shown in FIG. 3, the opening 48 is bulb shaped defined by an elongate portion 50 and circular portion 52.

Figure 5:
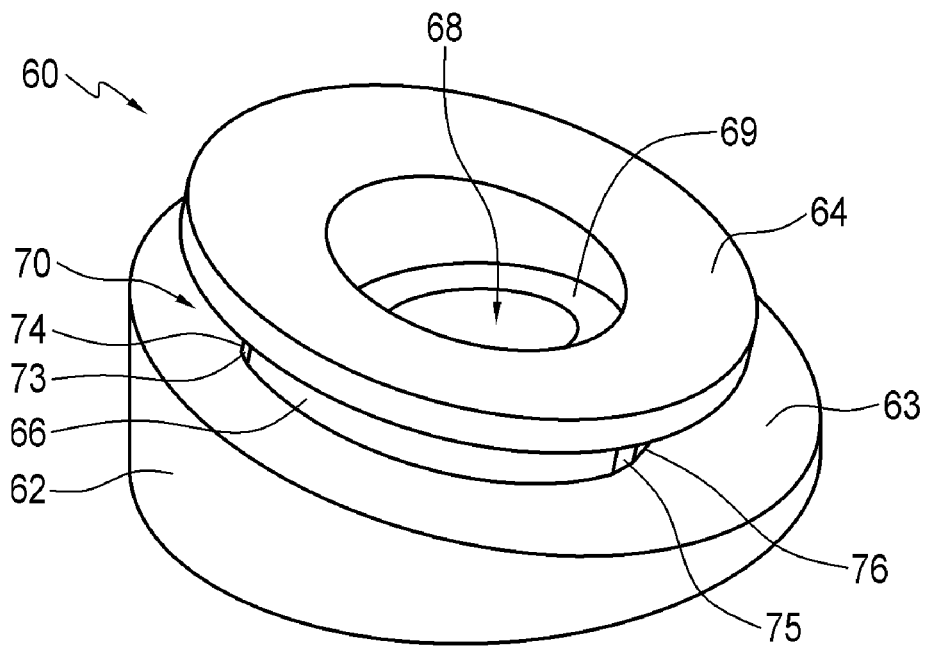
FIG. 5 is a side perspective view showing a male connector of the device of FIG. 1.
Figure 6:
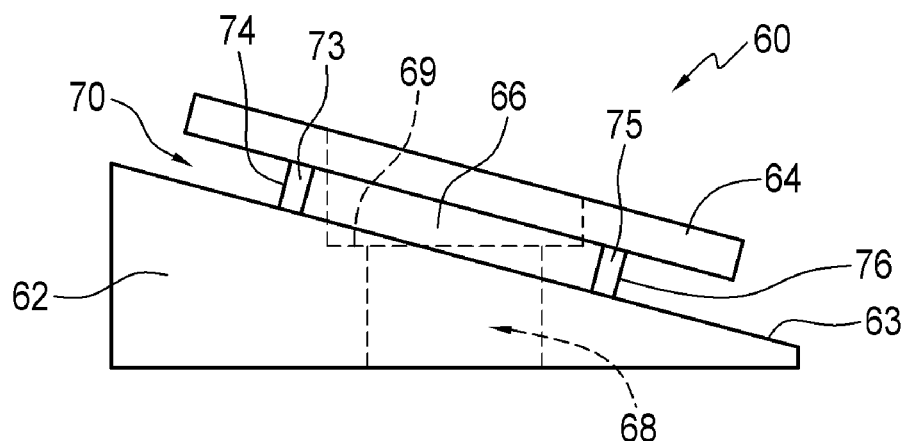
FIG. 6 is a side elevation view showing a male connector of the device of FIG. 1.
Figure 7:
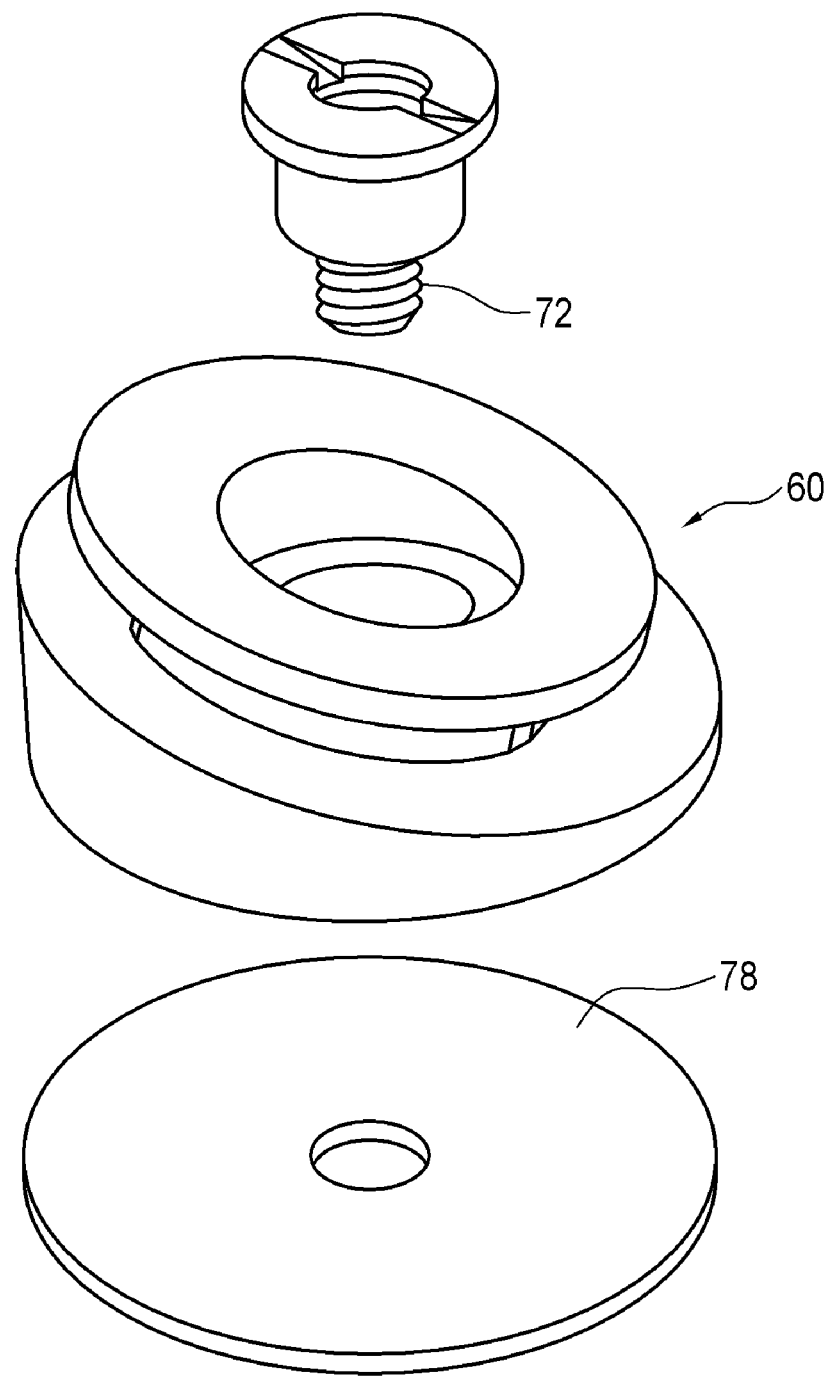
FIG. 7 is an exploded, perspective view showing the showing the male connector of FIG. 5, a threaded member and a washer.
Figure 8:
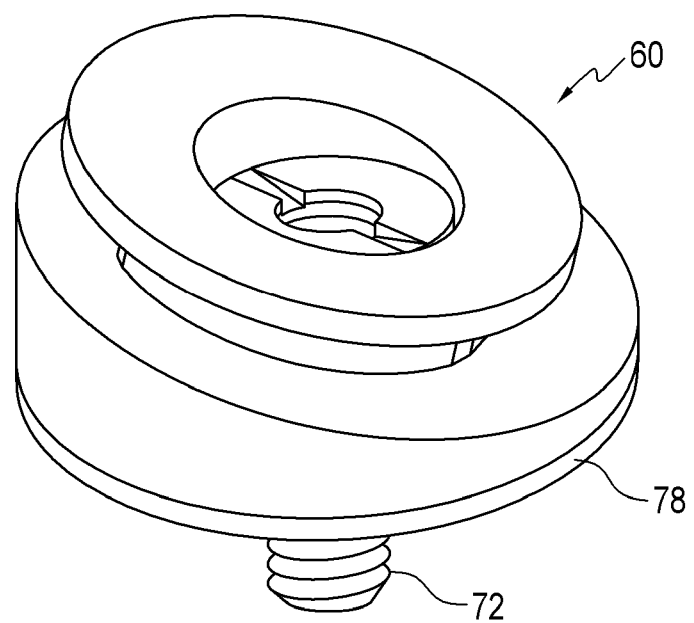
FIG. 8 is an assembled, perspective view of the connector of FIG. 7.
Figure 9:
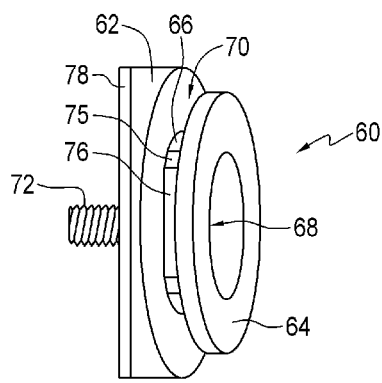
FIG. 9 is front perspective view showing the male connector of FIG. 5.
Figure 10:
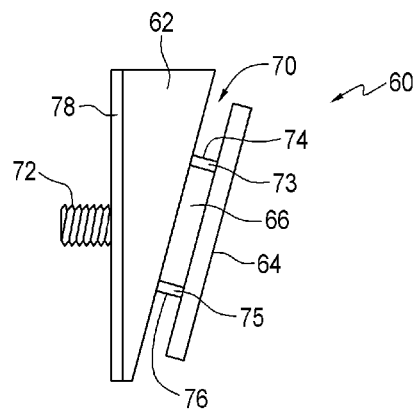
FIG. 10 is a side elevation view showing the male connector of FIG. 5.

Referring now to FIGS. 5 and 6, a male connector 60 is shown. In this example, the male connector 60 is formed from anodized aluminum although other materials may be used. The male connector 60 generally includes a base 62 and a plate 64 which is spaced-apart from the base 62 by a central body 66. There is an aperture 68 with a shoulder 69 extending though the male connector 60. The base 62 is a substantially wedge shaped member having a circular periphery and a preferred slope of 15° although the periphery and slope may vary in other examples, i.e. the slope may be between 5° and 25°. The body 66 has a smaller extent than both the base 62 and a plate 64. This structure defines a substantially annular recess 70 between the base 62 and a plate 64. The central body 66 is a truncated cylinder having a pair of opposite flat edges 74 and 76 that extend generally perpendicular to the slope of the base 62. Chamfers 73 and 75 extend between the flat edges 74 and 76 and rounded edges of the body 66. The plate 64 is disposed on a sloped surface 63 of the base 62.

Figure 15:
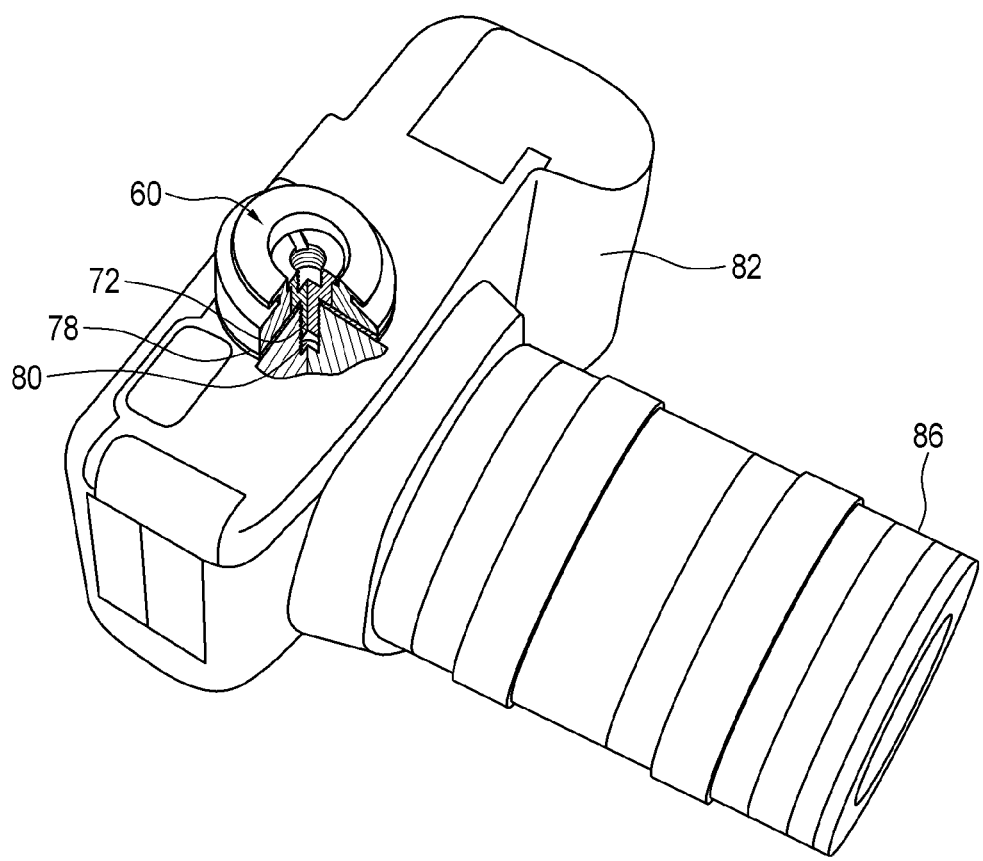
FIG. 15 is a perspective view showing the male connector of FIG. 5 engaged with a threaded female tripod receiver of a camera.

The opening 68 receives a threaded member in the form of a bolt 72 as best shown in FIGS. 7 to 10. The shoulder 69, shown in FIGS. 5 and 6, prevents the bolt from passing through the opening. A washer 78 is also shown in FIGS. 7 to 10. The washer 78 limits friction between components as will be discussed below. In this example, the bolt 72 is a stainless steel marine grade bolt and the washer 78 is a high-density rubber washer. The threaded member 72 extends outwardly from the male connector 60 and is designed to engage a threaded female tripod receiver 80 of a camera 82 as shown in FIG. 15. The washer 78 is disposed between the male connector 60 and the camera 82 to reduce friction between these components. Preferably the male connector 60 is positioned sloping downwards to the camera lens. It is possible to position the male connector 60 in a desired position because the male connector does not rotated as the bolt 72 is threaded into the female tripod receiver 80 of a camera 82.

Figure 11:
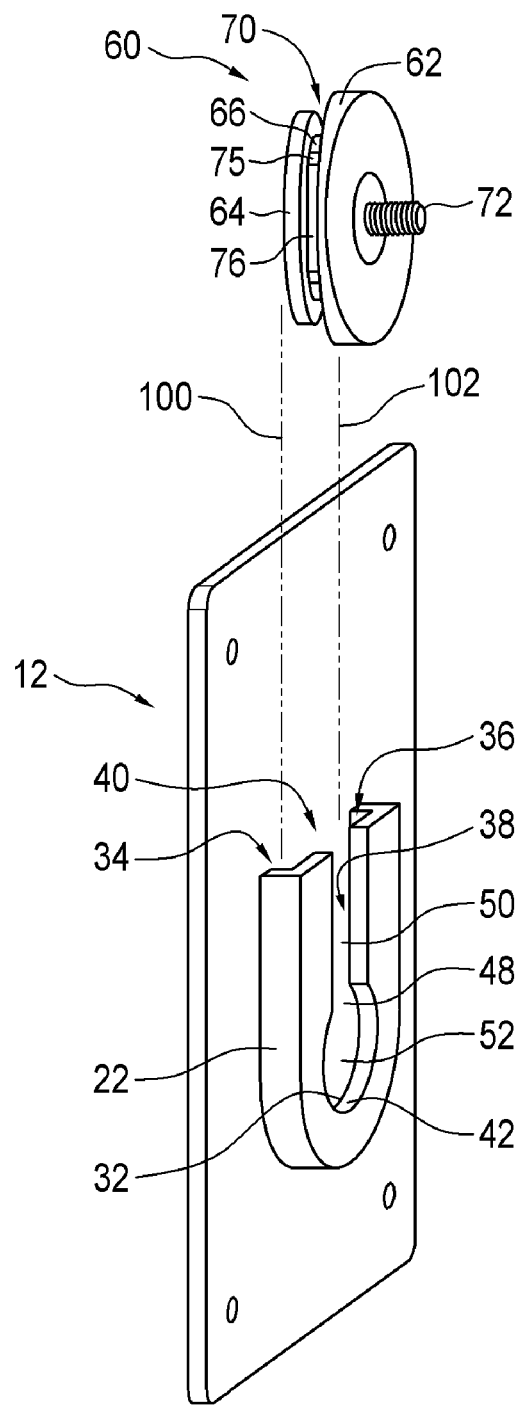
FIG. 11 is an exploded view showing the female connector of FIG. 2 and the male connector of the FIG. 5.
Figure 12:
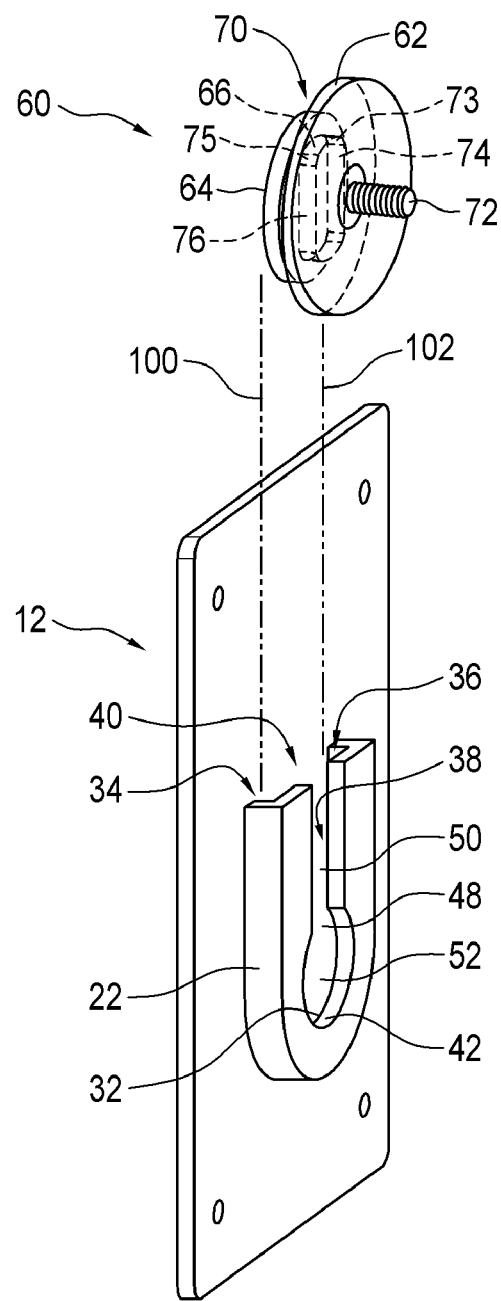
FIG. 12 is an exploded view showing the female connector of FIG. 2 and the male connector of the FIG. 5.

Referring now to FIGS. 11 to 14, the U-shaped slot 38 of the female connector 12 and the annular recess 70 of the male connector 60 allows the male connector 60 to be rotatably received by the female connector 18. FIGS. 11 and 12 in particular show that the plate 64 of the male connector 60 is slidably received by the U-shaped slot 38 of the female connector 12. The plate 64 is received though the opening 40 between the channels 34 and 36 as indicated by broken lines 100 and 102. However, the male connector 60 is only received by the female connector 12 in a particular orientation. The flat edges 74 and 76 of the truncated cylindrical body 66 of the male connector 60 must be aligned with the elongate portion 50 of the opening 48 in the U-shaped protrusion 22 of the female connector 12, i.e. with channels 34 and 36. Otherwise the extent of the truncated cylindrical body 66 of the male connector 60 will be too wide to pass through the elongate portion 50 of the opening 48 in the U-shaped protrusion 22 of the female connector 12.

Figure 13:
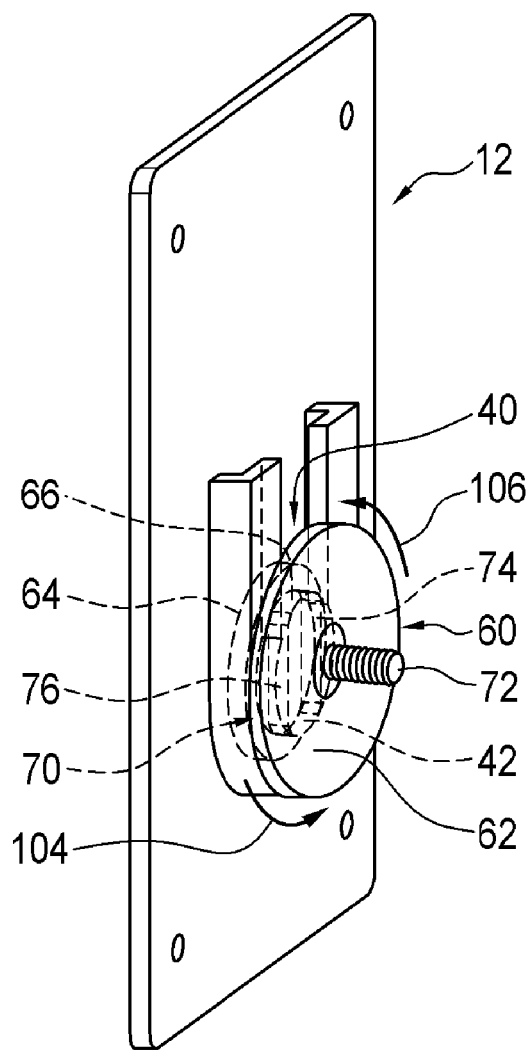
FIG. 13 is a perspective view showing the female connector of FIG. 2 and the male connector of the FIG. 5 in a releasable position.

As best shown in FIG. 13, when the plate 64 of the male connector 60 is received by the U-shaped slot 40 of the female connector 12, the cylindrical body 66 of the male connector 60 contacts the lip 42 of the pocket 32, which is shown in FIGS. 11 and 12, of the female connector 12. The annular recess 70 of the male connector 60 engages the lip 42 of the pocket 32 of the female connector 12. Accordingly, the base 62 and the plate 64 of the male connector 40 are on opposite sides of the U-shaped slot 40 of the female connector 12. This prevents accidental decoupling of the male connector 60 and the female connector 12, while still allowing the male connector 60 to freely rotate bi-directionally and through 360 degrees relative to the female connector 12 as indicated generally by arrows 104 and 106. The chamfers 73 and 75 allow for smooth rotation of the male connector 60 along the on the lip 42 of the pocket 32.

Figure 14:
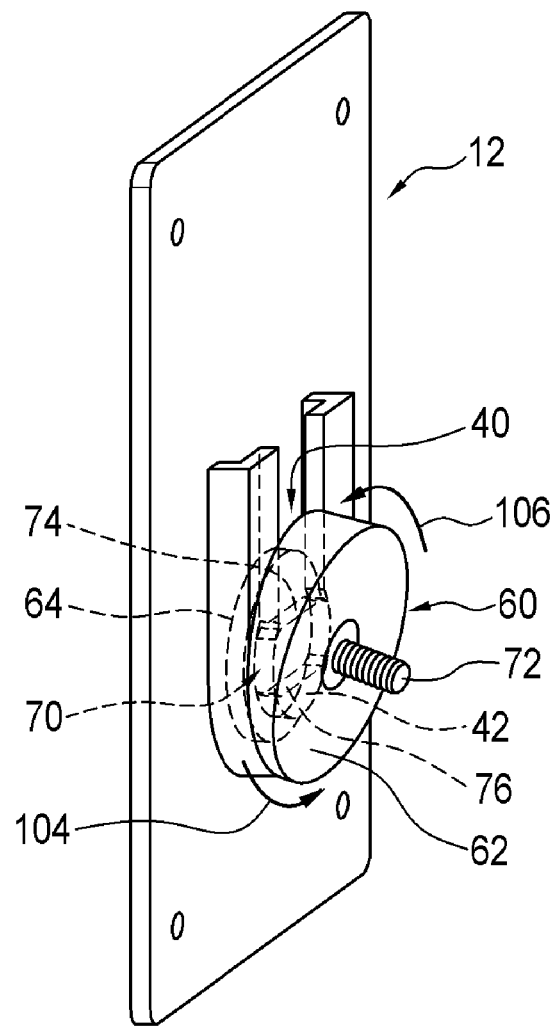
FIG. 14 is a perspective view showing the female connector of FIG. 2 and the male connector of the FIG. 5 in a locked position.

Once the male connector 60 has been received by the female connector 12, as shown in FIG. 13, the male connector 60 may be rotated as indicated by either arrow 104 or 106. The flat edges 74 and 76 of the truncated cylindrical body 66 of the male connector 60 are thereby brought out of alignment with the elongate portion 50 of the opening 48 in the U-shaped protrusion 22 of the female connector 12. This is shown in FIG. 14. In this position the male connector 60 is locked in place and cannot be released from the female connector 12. To release the male connector 60 from the female connector 12, the male connector 60 is rotated as indicated by either arrow 104 or 106 to bring the flat edges 74 and 76 of the truncated cylindrical body 66 of the male connector 60 back into alignment with the elongate portion 50 of the opening 48 in the U-shaped protrusion 22 of the female connector 12. This is shown in FIG. 13. In this position the male connector 60 can be released from the female connector 12.

Figure 16:
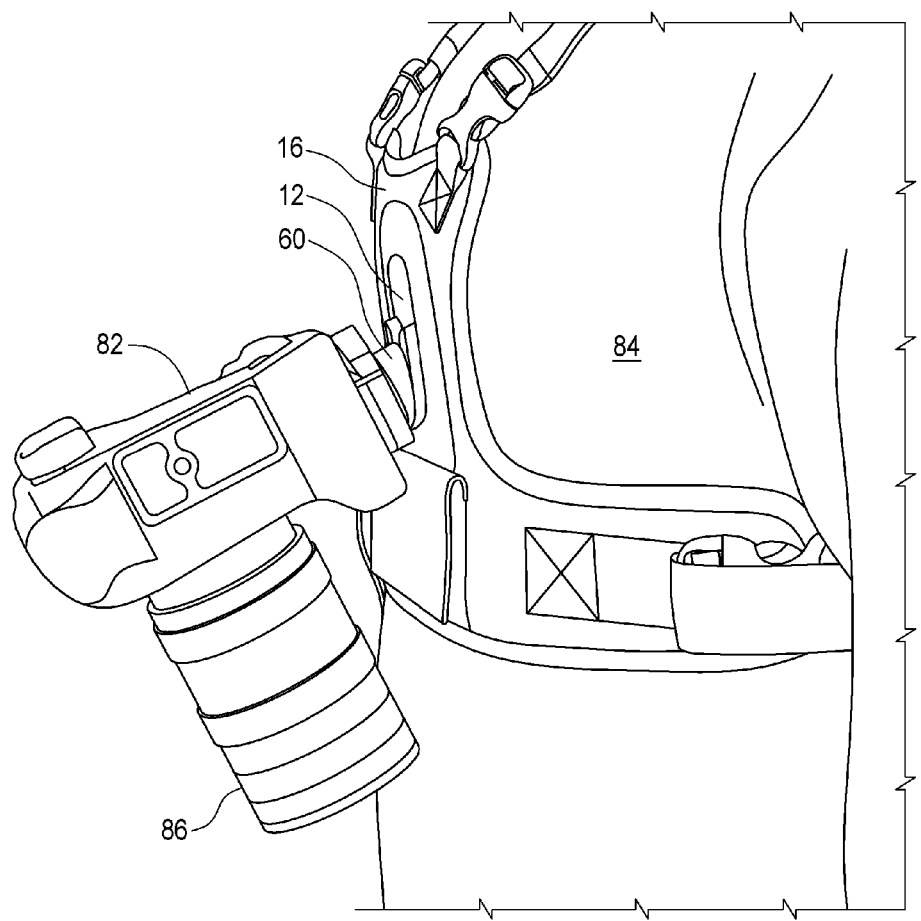
FIG. 16 is a side perspective view showing a camera rotatably mounted in a first position on a person.
Figure 17:
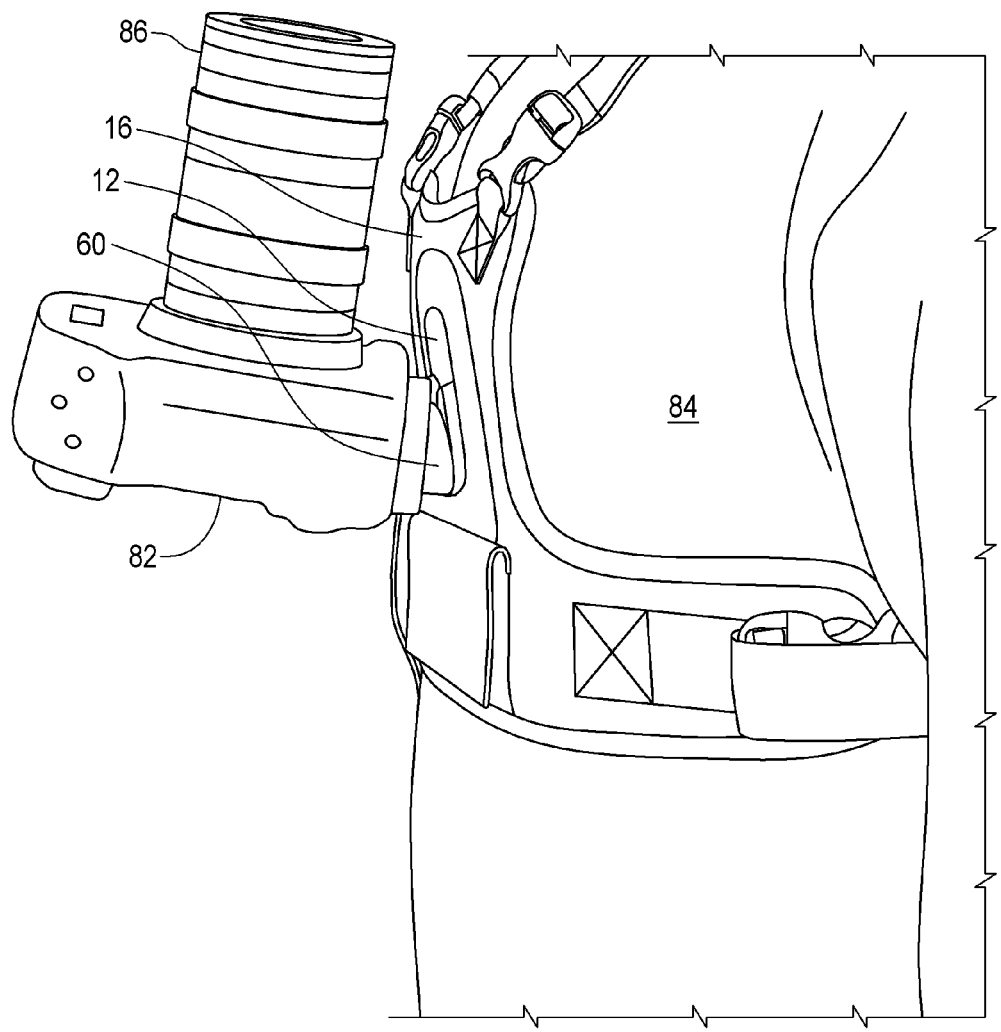
FIG. 17 is a side perspective view showing a camera rotatably mounted in a second position on a person.

In operation, the bolt 72 engages the threaded female tripod receiver 80 of the camera 82 and secures the male connector 60 to the camera 82 as shown in FIG. 14. The male connector 48 can then be coupled, as described above, to the female connector 12 which is mounted on a person 84 by the vest 16 as shown in FIGS. 16 and 17. This allows the person 84 to carry the camera 82 in a hands-free manner. The camera 82 can be rapidly and easily removed from the device 10 because the male connector 60 is simply slidably received by the female connector 12. Furthermore, because the male connector 60 is rotatably coupled to the female connector 12, the carried camera 82 can be rotated between a first position shown in FIG. 16 and a second position shown in FIG. 17.

In the first position of FIG. 16 the slope of the male connector 60 cause the lens 86 of full body cameras and gripped cameras to contact the person 84. This prevents free cantilevering of the camera 82. This also reduces stress on both the device 10 and the camera 82. In the position shown in FIG. 17, the person 84 is able to easily remove and changes lens.

It will be understood by a person skilled in the art that although in this example the male connector is secured to the camera and the female connector is mounted on the person's chest that in other examples a male connector may be secured to the camera and a female connector may be mounted on the person. Alternatively, any suitable means to rotatably mount the camera may be used. For example, in another embodiment, the base and plate of the male connector may be rotatably connected to each other allowing for a squared plate to be received by the female connector while still allowing for rotation of the mounted camera.

It will further be understood by someone skilled in the art that many of the details provided above are by way of example only and are not intended to limit the scope of the invention which is to be determined with reference to the following claims.

What is claimed is:

1. A device for rotatably mounting a camera on a person, the camera having a threaded tripod receiver and the device comprising:
   a female connector having a U-shaped slot defined by a pocket and a pair of opposed channels which extend from the pocket;
   a male connector having a wedge shaped base, a plate spaced-apart from the base, and an opening extending through the wedge shaped base and the plate, the plate being slidably received by the U-shaped slot of the female connector, and the plate being rotatable through 360 degrees within the pocket of the female connector;
   a threaded member extending through the opening in the male connector, the threaded member being for engaging the threaded tripod receiver of the camera;
   a strap assembly connected to the female connector, the strap being for mounting the device to the person; and
   wherein the plate has a first rotatable position within the pocket of the female connector in which the male connector is secured to the female connector, and a second rotatable position within the pocket of the female connector in which the male connector is releasable from the female connector.

2. The device as claimed in claim 1 wherein the male connector further includes a central body disposed between the wedge shaped based, the central body of the male connector being a truncated cylindrical body with a straight edge so that the plate of the male connector can only be received or released from the U-shaped slot of the female connector when the straight edge of the truncated cylindrical body of the male connector is aligned with one of the opposed channels of the female connector.

3. The device as claimed in claim 1 wherein there is a bulb shaped opening in the U-shaped slot, the bulb shaped opening being disposed between the pair of opposed channels which extend from the pocket.

4. The device as claimed in claim 1 wherein the strap assembly includes a vest and the female connector is disposed within the vest.

5. The device as claimed in claim 1 wherein the strap assembly includes a holster and the female connector is disposed within the holster.

6. The device as claimed in claim 1 wherein the female connector is defined by a plate and a U-shaped protrusion, the U-shaped protrusion being integral with and protruding from the plate.

7. The device as claimed in claim 1 wherein the plate of the male connector is circular and is disposed on a sloped surface of the wedge shaped base.

8. The device as claimed in claim 1 wherein the wherein the plate of the male connector is circular and is disposed concentrically on the wedge shaped base.

9. The device as claimed in claim 1 wherein the wedge shaped base has a slope of between 5° and 25°.

10. The device as claimed in claim 1 wherein the wedge shaped base has a slope of 15°.

11. A device for rotatably mounting a camera on a person, the camera having a threaded tripod receiver and the device comprising:
    a female connector having a U-shaped slot defined by a pocket and a pair of opposed channels which extend from the pocket;
    a male connector having a wedge shaped base with a slope of between 5° and 25°, a circular plate spaced-apart from a sloped surface the base, and an opening extending concentrically through the wedge shaped base and the plate, the plate being slidably received by the U-shaped slot of the female connector, and the plate being rotatable through 360 degrees within the pocket of the female connector;
    a threaded member extending through the opening in the male connector, the threaded member being for engaging the threaded tripod receiver of the camera;
    a strap assembly connected to the female connector, the strap being for mounting the device to the person; and
    wherein the plate has a first rotatable position within the pocket of the female connector in which the male connector is secured to the female connector, and a second rotatable position within the pocket of the female connector in which the male connector is releasable from the female connector.

12. The device as claimed in claim 1 wherein the male connector further includes a central body disposed between the wedge shaped based, the central body of the male connector being a truncated cylindrical body with a straight edge so that the plate of the male connector can only be received or released from the U-shaped slot of the female connector when the straight edge of the truncated cylindrical body of the male connector is aligned with one of the opposed channels of the female connector.

* * * * *